No. 705,461. Patented July 22, 1902.
E. J. SMITH.
SPARK ARRESTING AND DISCHARGING DEVICE.
(Application filed May 1, 1902.)
(No Model.)
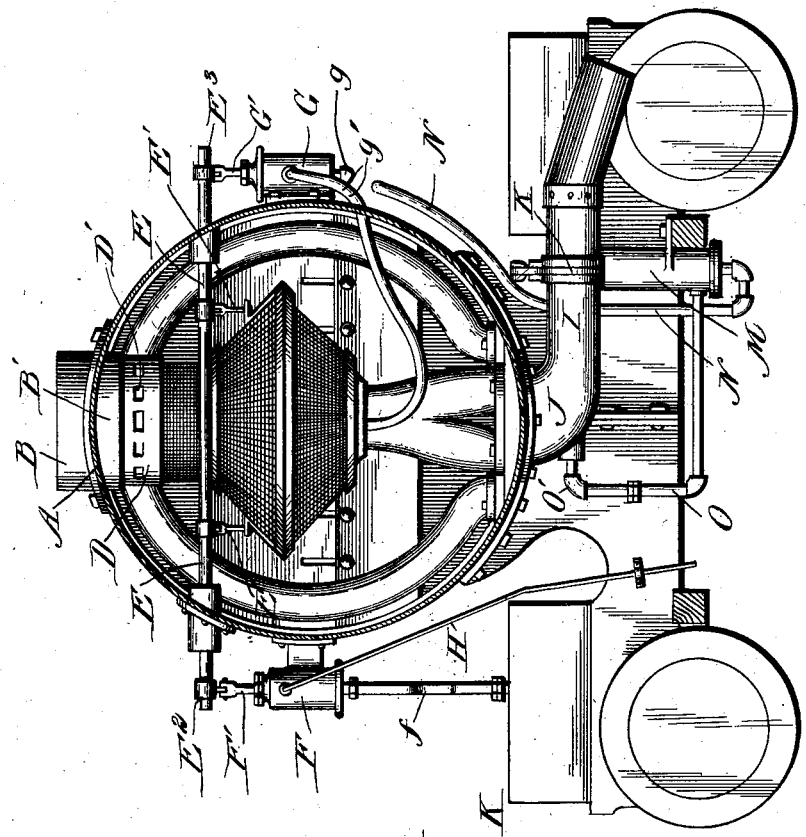
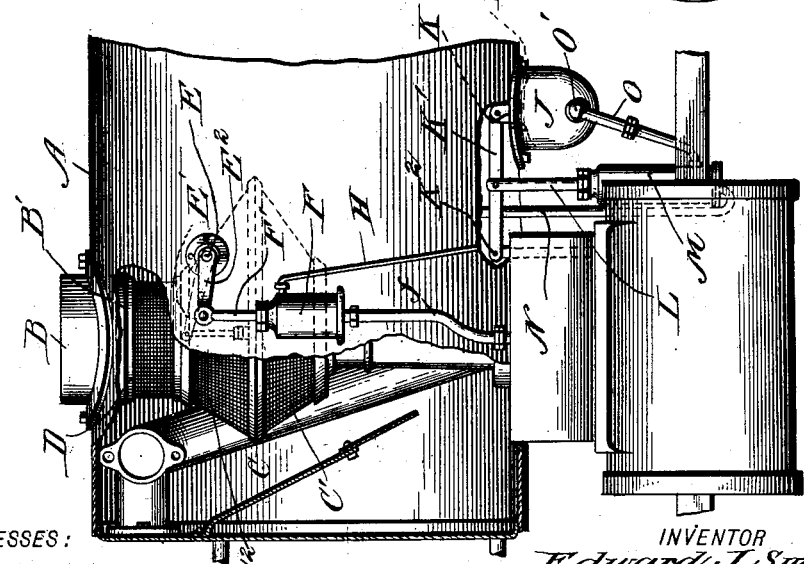
WITNESSES:
Fred P. Bradford
Perry B. Turpin
INVENTOR
Edward J. Smith
BY Munn & Co.
ATTORNEYS
THE NORRIS PETERS CO., PHOTO-LITHO., WASHINGTON, D. C.

UNITED STATES PATENT OFFICE.

EDWARD J. SMITH, OF HIGH SPRINGS, FLORIDA.

SPARK ARRESTING AND DISCHARGING DEVICE.

SPECIFICATION forming part of Letters Patent No. 705,461, dated July 22, 1902.

Application filed May 1, 1902. Serial No. 105,503. (No model.)

*To all whom it may concern:*

Be it known that I, EDWARD J. SMITH, a citizen of the United States, and a resident of High Springs, in the county of Alachua and State of Florida, have made certain new and useful Improvements in Spark Arresting and Discharging Devices, of which the following is a specification.

My invention is an improvement in spark arresters and dischargers for use on coal or wood burning locomotive-engines; and the invention consists in certain novel constructions and combinations of parts, as will be hereinafter described and claimed.

In the drawings, Figure 1 is a side elevation from the right side of the front end of the smoke-box, parts being broken away and others shown in section; and Fig. 2 is a front elevation of the smoke-box, parts being broken away and others shown in section.

The smoke-box A supports the stack-saddle B, a flange B' being preferably provided, extending below the shell of the smoke-box in position to receive the top ring of the cage, presently described, the cage being slidable up to closed position, as shown in Fig. 1, and down to open position, as shown in Fig. 2.

The cage C may be made of wire-netting or of perforated steel, as desired, and may preferably be composed of the tapering base and upper sections C' and $C^2$, whose bases are united, and the upper section $C^2$ having a cylindrical top or cap tube D, which is provided with a series of slots D', as shown in Fig. 2. When the cage is in its upper or closed position, (shown in Fig. 1,) the cap-tube D is projected into the flange B' of the stack-saddle and the slots D' are closed, while in the open position of the cage, as shown in Fig. 2, the slots D' are below the flange B' and are open and permit a comparatively unobstructed draft to the stack.

It being well known that artificial or forced draft is what causes a locomotive to throw fire or sparks, I provide means whereby the cage will be forced to closed position, as shown in Fig. 1, when the engine is working and when the blower is applied. To this end the cage C is supported on crank-arms E', projecting from a shaft E, such shaft being also provided with crank-arms $E^2$ and $E^3$, connected by piston-rods F' and G' with pistons operating in cylinders F and G. The cylinder F is connected by a pipe *f* with the right-hand steam-chest in such manner as to receive steam therefrom whenever the engine is working and operate upon the crank-arm $E^2$ in such manner as to rock the shaft E and adjust the cage to closed position, as shown in Fig. 1. A release-pipe H connects with the upper portion of the cylinder F to permit the escape of any pressure that may leak past the piston in the cylinder F. By this construction the cage will be pressed to closed position when the steam is on and the engine is working and will be lowered to the open position (shown in Fig. 2) when steam is cut off. To prevent sparks from being discharged from the engine when at rest or drifting and when the blower is put on, I provide the cylinder G, whose piston is connected by the rod G' with the crank-arm $E^3$, the blower-pipe *g*, leading to the cylinder G, and a small pipe *g'*, leading from the cylinder G into the smoke-box for the blower. I usually make the pipe *g* a three-quarter-inch pipe, leading from the boiler-head to the cylinder to charge the cylinder; and the pipe *g'* a one-half-inch pipe to take the pressure from the cylinder into the stack to act as a blower, so the piston in cylinder G will be raised by the pressure supplied by the three-quarter-inch pipe to a certain height and maintained at such height slightly above the pipe *g'*, through which pipe the pressure will be taken from the cylinder to the stack to act as a blower. I thus force the cage C to closed position automatically whenever steam is on or the blower is applied.

The cylindrical construction of the cap D of the cage is important, as it constitutes a guide for the upper end of the stack for the cage and also provides for opening or closing the draft as desired. This sliding joint between the cage and the base of the stack-saddle flange relieves the cage of unnecessary pressure, such as results from an abutting joint, as when the upper end of the cage is caused to abut the stack-saddle when moved upwardly to closed position.

To provide for discharging the sparks whenever desired, I provide a lateral discharge-tube I, leading from a hopper J, which is riveted to the under side of the smoke-box, as shown, said pipe I having a slide or gate K, which may be adjusted to open or close the discharge-pipe and is supported on a lever K', which is pivoted at K² and is connected with the piston-rod L, extending from cylinder M. Steam is supplied to the cylinder M by a pipe N, and a pipe O opens into the cylinder M at a suitable distance from its lower end and extends thence into the inner end of the discharge-pipe I and discharges thereto at O' in such manner as to force the sparks accumulated in the hopper and discharge-pipe outwardly when the gate or valve K is opened. Steam is admitted through the pipe N to the cylinder M from the engine-cab, and when the piston in the cylinder M has been raised about three inches steam will pass from such cylinder through the pipe O to blow the sparks and cinders out to the side of the track when the engine is running along. Steam may be admitted to the pipe N through an angle-cock screwed into the boiler-head, where it can be operated by the engineer or fireman in the cab when the engine is running or standing still. In the operation of ejecting the sparks it will be noticed the steam when supplied through the pipe N first operates to open the valve K and then passes from the cylinder M to eject the sparks from the lateral discharge-pipe, as will be understood from the drawings.

Having thus described my invention, what I claim as new, and desire to secure by Letters Patent, is—

1. The combination substantially as herein described of the smoke-box, the stack-saddle and the cylindrical flange depending within the smoke-box, the spark-arresting screen or cage operating in the smoke-box and provided at its upper end with the cylindrical cap operating in the flange of the stack-saddle and provided with slots which may be adjusted into and below the cylindrical flange, and means for operating the screen or cage into the closed position and to permit it to drop to open position substantially as and for the purposes set forth.

2. A spark-arresting screen or cage for locomotives provided at its upper end with a cylindrical cap having numerous slots and a cylindrical flange in which said cap operates and means whereby the screen or cage may be raised and lowered, substantially as set forth.

3. The combination with the locomotive smoke-box of the spark-discharging tube connected therewith, a valve in said tube, a steam-pipe for discharging the sparks from said tube when the valve is opened, and steam-operated means for opening the valve and for permitting the passage of pressure to the spark-discharging steam-pipe, substantially as set forth.

4. The combination of the smoke-box, the spark-discharging tube leading therefrom, a valve in said tube, a cylinder having the piston-rod and devices whereby the movements of said rod operate the valve or gate, a pressure-pipe leading to said cylinder for operating its piston, and a pipe leading from said cylinder to the spark-discharging tube and arranged to be opened to the pressure after the valve has been opened by the travel of the piston in said cylinder substantially as and for the purposes set forth.

5. The combination of the smoke-box, the pipe I, the valve K, the lever connected with said valve, the cylinder M, the supply-pipe N leading to the lower end of said cylinder, the pipe O leading from said cylinder above its lower end, and the piston-rod extending from said cylinder and connected with the lever for operating the valve K, substantially as and for the purposes set forth.

EDWARD J. SMITH.

Witnesses:
T. J. LONGMAN,
A. E. ADAMS.